United States Patent

[11] 3,630,766

| [72] | Inventors | James Economy<br>Eggertsville;<br>Vlado I. Matkovich, Williamsville, both of N.Y. |
|---|---|---|
| [21] | Appl. No. | 879,932 |
| [22] | Filed | Nov. 25, 1969 |
| [45] | Patented | Dec. 28, 1971 |
| [73] | Assignee | The Carborundum Company<br>Niagara Falls, N.Y. |

[54] REFRACTORY FIBERS AND METHOD OF PRODUCING SAME
10 Claims, No Drawings

[52] U.S. Cl. .................................................. 106/55, 106/57
[51] Int. Cl. ............................................... C04b 35/58
[50] Field of Search ........................................... 106/55, 57; 23/191

[56] References Cited
UNITED STATES PATENTS

| 3,012,856 | 12/1961 | Berry | 23/191 |
| 3,370,923 | 2/1968 | Hough | 23/191 |
| 3,399,979 | 9/1968 | Hamling | 23/191 |

Primary Examiner—James E. Poer
Attorney—K. W. Brownell

ABSTRACT: Boron nitride fibers having a maximum diameter of about 10 microns are heated at a temperature of at least about 1,100° C. in a gaseous atmosphere consisting essentially of hydrogen and a halide of a transition metal selected from the group consisting of titanium, niobium, zirconium, tantalum and hafnium. The fibers are thereby converted to refractory fibers which consist essentially of the corresponding transition metal nitride and from about 2 percent to about 10 percent boron.

REFRACTORY FIBERS AND METHOD OF PRODUCING SAME

BACKGROUND OF THE INVENTION

This invention relates to refractory fibers consisting essentially of a transition metal nitride and boron, and to a process for their production.

In recent years, there has been a rapidly increasing interest in the development of various types of inorganic fibers. Such fibers have a wide variety of utilities, and are perhaps of principal interest in connection with the fabrication of high-strength structural materials, such materials comprising a matrix of metal, ceramic or plastic reinforced by the incorporation therein of inorganic fibers. Methods for the preparation of such fiber-reinforced composite materials are well known. Refractory inorganic fibers also find use, for example, in the fabrication of filter media which withstand corrosive environments at high temperatures, and in the manufacture of heat and flame resistant fabrics.

SUMMARY OF THE INVENTION

The present invention is concerned with highly refractory inorganic fibers of a novel composition, and with a novel method for the production of such fibers. More particularly, the invention contemplates the production of refractory fibers which have a maximum diameter of about 10 microns and which consist essentially of (1) a nitride of a transition metal selected from the group consisting of titanium (Ti), niobium (Nb), zirconium (Zr), tantalum (Ta) and hafnium (Hf), and (2) from about 2 percent to about 10 percent boron (B).

In accordance with the process of the present invention, a fiber having a maximum diameter of about 10 microns and consisting essentially of boron nitride (BN) is heated at a temperature of at least about 1,100° C. in a gaseous atmosphere which consists essentially of hydrogen and a halide of a transition metal selected from the group consisting of Ti, Nb, Zr, Ta and Hf. Preferably, the transition metal halide is selected from the group consisting of titanium tetrachloride (TiCl$_4$), niobium pentachloride (NbCl$_5$), zirconium tetrachloride (ZrCl$_4$), tantalum pentachloride (TaCl$_5$) and hafnium tetrachloride (HfCl$_4$). As a result of such heating, for a sufficient time, in the prescribed atmosphere, a complex reaction occurs, and there is produced a refractory fiber, as described above, having approximately the same diameter as the starting BN fiber and consisting essentially of a nitride of the transition metal whose halide was employed and about 2 percent to about 10 percent boron.

The invention will be further described with reference to the following examples, which are intended to illustrate and not to limit the invention, and the subsequent detailed discussion of the preferred embodiments.

DESCRIPTION OF THE PREFERRED EMBODIMENTS

EXAMPLE 1

A conventional tube furnace is employed comprising a horizontal, cylindrical mullite tube having an inner diameter of 4 cm., the middle or "hot zone" of which may be heated by external electrical resistance heating elements which are disposed parallel to the longitudinal axis of the tube.

A 0.3 g. loose, fluffy mass of BN fibers analyzing 40% B and 55% N and having a diameter of about 4 microns is placed in an alumina boat which is placed within the hot zone of the furnace tube at room temperature. The hot zone is heated to about 1,300° C. while maintaining a current of nitrogen through the furnace tube to prevent oxidation of the BN fibers. The nitrogen current is established by the introduction of nitrogen into one end of the tube, which is vented to the atmosphere at its other end. The temperature is held at about 1,300° C. and a current of hydrogen, at a flow rate of about 300 ml./min., is substituted for the nitrogen current. While maintaining the hydrogen current, TiCl$_4$ vapor generated by boiling liquid TiCl$_4$ is introduced into the furnace tube at the same end as the hydrogen, at a rate of about ⅛ g./min. The hydrogen and TiCl$_4$ flow through the tube is continued at about 1,300° C. for about 1 hour, then discontinued, and the furnace and contents are permitted to cool to about room temperature with a current of nitrogen passing through the furnace tube to prevent oxidation of the product.

A 1.0 g. yield of fibers having a diameter of about 4 microns is obtained. The fibers are very flexible, smooth surfaced, gold in color, and have a shiny, metallic appearance. They have a density of 4.9 g./cc., closely approaching the theoretical density of 5.2 g./cc. for titanium nitride (TiN). X-ray powder diffractometry using monochromatic copper K-alpha radiation indicates that the fibers consist essentially of TiN. However, chemical elemental analysis shows that a significant amount of boron is also present: Ti, 75.2 percent; N, 18.7 percent; B, 4.8 percent.

EXAMPLE 2

The furnace employed is the same as that used in example 1. A 0.18 g. loose, fluffy mass of BN fibers identical with those used in example 1 is placed in an alumina boat which is placed within the hot zone of the furnace tube at room temperature. The hot zone is heated to about 1,370° C. while maintaining a current of nitrogen through the furnace tube. The temperature is then held at about 1,370° C. and a current of hydrogen, at a flow rate of about 100 ml./min., is substituted for the nitrogen current. NbCl$_5$ vapor is generated within the furnace tube and carried by the hydrogen current to the fibers by virtue of an alumina boat containing about 30 g. of solid NbCl$_5$ which was previously placed in the cool furnace tube at a location such that it would be heated to about 200°–225° C. when the hot zone reached about 1,370° C. The run is continued for about 45 minutes, at which point the NbCl$_5$ is depleted, then heating is discontinued, and the furnace and its contents are allowed to cool to about room temperature with a current of nitrogen passing through the furnace tube to prevent oxidation of the product.

A 0.69 g. yield of fibers having a diameter of about 4 microns is obtained. The fibers are very flexible, smooth surfaced, brown in color, and have a shiny, metallic appearance. They have a density of 7.8 g./cc. X-ray powder diffractometry using monochromatic copper K-alpha radiation indicates that the fibers consist essentially of niobium nitride (NbN), but elemental analysis shows that boron is also present to the extent of several percent.

Although the process of the invention may be carried out employing but a single BN fiber of any desired length, and the invention has been so described in part herein, it is to be understood that the process may be, and usually is preferably, carried out employing a plurality of BN fibers, as in the examples. For instance, the fibers may be in the form of a staple consisting of a mass of relatively short fibers, or in a bundle of continuous filaments of considerable length. The fibers should preferably not be very tightly compressed together during the process so that there is adequate contact between each fiber and the gaseous atmosphere to permit the desired reaction to occur.

It will also be understood that, while a horizontal tube furnace such as that employed in the examples is particularly convenient for carrying out the process of the invention, other types of furnaces familiar to those skilled in the art and capable of generating the requisite temperature and containing the required gaseous atmosphere may be used, such as vertical tube furnaces, induction furnaces and the like.

Now considering the various aspects of the invention in detail, starting fibers consisting essentially of boron nitride which are suitable for the practice of the invention may be obtained commercially or may be readily prepared by methods taught in the prior art. For example, U.S. Pat. No. 3,429,722 to Economy et al. describes the preparation of boron nitride fibers by a nitriding method which, in essence, comprises heating boric oxide fibers at a rate of temperature rise between 25°

C./hr. and 5,000° C./hr. up to a final temperature between about 300° and 1,500° C. in a current of ammonia having a flow rate between 0.025 l./min./g. and 6 l./min./g. of fibers, whereby the boric oxide is converted to BN. An eminently suitable nitriding procedure for the preparation of starting BN fibers for the present invention has been found to comprise heating boric oxide fibers in a current of ammonia having a flow rate of 1 l./min./g. of fibers at a rate of temperature rise of 50° C./hr. from room temperature (about 25° C.) to 1,000° C. and then holding the fibers at this temperature with the stated ammonia flow rate for about 5 hours. The fibers produced thereby consist essentially of boron nitride, although they may also contain small amounts of oxygen derived from the boric oxide and hydrogen derived from the ammonia, such contaminants being of no consequence insofar as the present invention is concerned. Thus the BN fibers employed in the examples analyzed 95 percent BN, the balance being oxygen and hydrogen. It appears that any hydrogen present in the starting BN fibers is dissipated during the heating in the gaseous atmosphere of hydrogen and the transition metal halide, for traces of hydrogen are seldom found in the final product, although small, inconsequential amounts of oxygen are sometimes detected in the final fibers if such was present in the starting BN fibers.

Boric oxide fibers suitable for the preparation of BN fibers by nitriding as described above may readily be prepared by conventional techniques such as those employed in producing glass fibers. Thus, for example, continuous boric oxide fibers may be spun from a boric oxide melt, being wound upon a revolving spool. Alternatively, boric oxide fibers may be blown in staple form by the conventional technique of causing a jet of any suitable gas to impinge upon a thin falling stream of molten boric oxide. Fibers having a diameter of a few microns or less, as well as coarser fibers, may easily be produced by blowing. If the melt used for such blowing or spinning contains a small amount of silica as well as boric oxide, the resulting fibers will contain not only boric oxide, but also silica. Such boric oxide fibers containing a small amount of silica may be nitrided by heating in ammonia as described above, whereupon the boric oxide is converted to BN but the silica remains unaffected, thus fibers consisting essentially of BN but containing a small amount of silica are produced. Such fibers are quite satisfactory for the production of refractory fibers according to the present invention, for any silica present remains unaffected by the heating in the hydrogen-metal halide atmosphere, thus fibers consisting essentially of a transition metal nitride and boron but containing a small amount of silica result.

For the purposes of the invention, there appears to be no critical minimum diameter of the BN fibers which may be employed, but they should have a maximum diameter no greater than about 10 microns. When fibers of greater diameter are employed, the desired reaction may not occur throughout the thickness of the fibers and the core of the fibers may remain unreacted or only partially reacted, resulting in fibers which may be nonuniform in composition throughout their cross section.

The conversion of BN fibers to the desired refractory fibers is accomplished by heating them in a gaseous atmosphere consisting essentially of hydrogen and a halide of Ti, Nb, Zr, Ta or Hf at a temperature of at least about 1,100° C. In some types of furnaces having a large capacity, and especially when only a small quantity of fibers is to be treated, the atmosphere may be established at the outset of the heating cycle and remain static. In other types of furnaces, such as tube furnaces, especially when a substantial quantity of fibers is to be treated, it may be necessary to maintain a current of the hydrogen and metal halide through the furnace, as in the examples, at a flow rate which is sufficient to provide a fresh supply of these substances to the fibers for the reaction.

The reaction which occurs appears to be quite complex and no attempt will be made here to describe it in detail. It may be that the hydrogen acts as a reducing agent upon the metal halide, and there is some evidence that other reducing gases such as carbon monoxide may satisfactorily be substituted for hydrogen in carrying out the process of the invention. However, there is also some evidence that the desired reaction and conversion occur satisfactorily when an inert gas such as argon or nitrogen is substituted for hydrogen.

Any of a wide variety of transition metal halides may be employed which are capable of being generated in the vapor phase at or below the reaction temperature selected, including the halides of the various valence states of Ti and Zr as well as the pentahalides of Nb and Ta and the tetrahalides of Hf. The chlorides are preferred, especially $TiCl_4$, $NbCl_5$, $ZrCl_4$, $TaCl_5$, and $HfCl_4$. Of these five compounds, $TiCl_4$ is a liquid at room temperature; the others are solids but boil or sublime below 350° C. and thus are readily converted to the vapor state. $ZrCl_4$, $TaCl_5$ and $HfCl_4$ may conveniently be employed by using the same procedure as was used with $NbCl_5$ in example 2, thereby producing refractory fibers consisting essentially of a nitride of Zr, Ta or Hf and boron.

The desired reaction may be effected by heating at a temperature of at least about 1,100° C., the reaction not occurring to any significant extent below that temperature. Temperatures up to 1,500° C. have been found to be very suitable. Much higher temperatures may be employed, if desired, within the capability of the apparatus used, since the starting BN fibers and the resulting refractory fibers have very high melting points, but the use of such higher temperatures generally offers no advantage. The heating is carried out for a time sufficient to result in the production of the desired refractory fibers, and a period of about 30–60 minutes is ordinarily sufficient. Longer periods may be employed without detriment but generally also without advantage.

The products of the present invention are refractory fibers having a diameter approximately the same as that of the starting BN fiber. X-ray powder diffractometry using monochromatic copper K-alpha radiation shows that they consist primarily of titanium nitride (TiN), niobium nitride (NbN), zirconium nitride (ZrN), tantalum nitride (TaN) or hafnium nitride (HfN), the metal corresponding to that of the halide employed in the process. However, chemical elemental analysis of a variety of samples shows that the fibers also contain boron in an amount which ranges between about 2 percent and about 10 percent. It appears that the boron is not present as free elemental boron, but rather in some type of chemical combination and/or possibly incorporated within the metal nitride crystal lattice.

In general, the fibers are smooth surfaced, shiny and metallic in appearance, and quite flexible. The last-mentioned attribute is particularly advantageous in facilitating the processing of the refractory fibers into desired forms. The fibers possess many of the properties characteristic of the metal nitrides of which they are largely composed: high melting points, and resistance to oxidation and to corrosive substances such as acids and alkalies. Measurements on fibers consisting essentially of TiN and B indicate moduli of elasticity as high as $1.9 \times 10^6$ kg./sq. cm. and tensile strengths as high as 3,500 kg./sq. cm.

In view of the properties of the refractory fibers, they are of use in the production of fiber-reinforced composites, especially in ceramic matrices, for structural and other purposes. In suitable fabric, paper or other form, the fibers are useful for high-temperature filtration of corrosive materials. Since NbN is known to be a superconducting material, fibers according to the invention consisting essentially of NbN and B are especially useful for electrical conductors.

Percentages referred to herein are percentages by weight except as otherwise expressly stated or clearly indicated by the context.

While the invention has been described herein with reference to certain examples and preferred embodiments, it is to be understood that various changes and modifications may be made by those skilled in the art without departing from the concept of the invention, the scope of which is to be determined by reference to the appended claims.

We claim:

1. A refractory fiber having a maximum diameter of about 10 microns consisting essentially of (1) a nitride of a transition metal selected from the group consisting of titanium, niobium, zirconium, tantalum and hafnium, and (2) from about 2 percent to about 10 percent boron.

2. A refractory fiber as defined in claim 1 wherein said metal is titanium.

3. A refractory fiber as defined in claim 1 wherein said metal is niobium.

4. A refractory fiber as defined in claim 1 wherein said metal is zirconium.

5. A refractory fiber as defined in claim 1 wherein said metal is tantalum.

6. A refractory fiber as defined in claim 1 wherein said metal is hafnium.

7. A process for the production of a refractory fiber as defined in claim 1 comprising heating a fiber which has a maximum diameter of about 10 microns and which consists essentially of boron nitride at a temperature of at least about 1,100° C. in a gaseous atmosphere consisting essentially of hydrogen and a transition metal chloride selected from the group consisting of titanium tetrachloride, niobium pentachloride, zirconium tetrachloride, tantalum pentachloride and hafnium tetrachloride for a time sufficient to produce said refractory fiber.

8. A process as set forth in claim 7 wherein said metal chloride is titanium tetrachloride.

9. A process as set forth in claim 7 wherein said metal chloride is niobium pentachloride.

10. A process as set forth in claim 7 wherein said metal chloride is zirconium tetrachloride.

* * * * *